United States Patent [19]

Kragh

[11] 4,019,951

[45] Apr. 26, 1977

[54] MAGMA COOLING TOWER

[76] Inventor: Loren G. Kragh, 29600 Eighth Ave. South, Federal Way, Wash. 98002

[22] Filed: July 20, 1973

[21] Appl. No.: 381,340

[52] U.S. Cl. .......................... 159/4 CC; 159/4 K; 159/45; 159/47 R; 261/DIG. 11
[51] Int. Cl.² ...................... B01D 1/16; B01D 1/00
[58] Field of Search ................. 159/4 R, 24 A, 4 K, 159/1 RW, 45, 1 S, 47 WL, 4 CC; 261/157, 112; 203/7; 210/1, 2

[56] References Cited

UNITED STATES PATENTS

| | | | |
|---|---|---|---|
| 2,151,079 | 3/1939 | Bowen | 159/1 RW |
| 2,385,955 | 10/1945 | Tomlinson | 159/4 A |
| 2,593,503 | 4/1952 | Tomlinson et al. | 159/4 A |
| 3,153,609 | 10/1964 | Markant et al. | 159/4 A |
| 3,290,025 | 12/1966 | Engalitcheff, Jr. | 261/112 X |
| 3,363,664 | 1/1968 | Villanueva | 159/45 X |
| 3,638,708 | 2/1972 | Farin | 159/4 A |

FOREIGN PATENTS OR APPLICATIONS

| | | | |
|---|---|---|---|
| 894,936 | 4/1962 | United Kingdom | 159/4 K |

*Primary Examiner*—Jack Sofer
*Attorney, Agent, or Firm*—Richard W. Hanes

[57] ABSTRACT

The invention is a method for removing dissolved solids from water by creating a condition of super-saturation of the solid material within a confined water circuit, propagating the formation of solids by a slurry process of evaporative crystallization which utilizes waste heat energy and separating the crystalized solids; the invention also involves the apparatus for carrying out the process which includes a continuous process circuit for circulating a super-saturated liquid and slurry, which circuit comprises a source of waste heat energy for propelling the process and cooling tower to provide evaporation, and further including a separator to remove crystallized solids from the slurry.

7 Claims, 3 Drawing Figures

MAGMA COOLING TOWER

BACKGROUND OF THE INVENTION

Environmental and conservation considerations have focused new attention on the existing ways and means of disposing of waste heat from large industrial installations such as power plants. A modern steam turbine electric power plant has a thermal efficiency of only about forty percent, meaning that 60 percent of the heat energy put into the system has to be eliminated as waste. In the majority of such plants, the heat is removed by drawing water from a stream or a lake or even a body of salt water, running it through the plant once and then returning the heated water to its source. This type of cooling is becoming less acceptable as questions arise about the adequacy of cooling water supplies and about the biological effects of warming natural bodies of water.

Two well-known alternatives to the "once through" cooling method are in common use. These are the "wet" and "dry" cooling tower system. In the dry system, heat is exchanged from the service water to air. While air is a perfectly good coolant, huge volumes of the gas must be moved and elaborate heat exchange surfaces must be provided in order to cool a large plant effectively. The initial cost of such a system is high.

A more practical alternative is the "wet" cooling tower, where both air and water serve as coolants. In such a tower, the service water being circulated through the plant comes in intimate contact with circulating air and heat is carried away, mostly through the process of evaporation. The rest of the water is collected at the bottom of the tower and returned to the system to perform its function in the steam condenser where the water again is heated. Because the tower cooling is mainly evaporative, part of the service water circulating through the system is lost. The rule of thumb is one percent of evaporation loss for each ten degrees farenheit of cooling.

There are two other sources of water loss; the first is drift, meaning water that is carried away from the tower as very fine droplets suspended in the air leaving the tower. The second source of loss results from the need to constantly bleed off part of the water and dispose of it in order to maintain a substantially fixed level of dissolved solids in the water. Without the bleed off, or "blowdown", as it is called in the art, the evaporative loss of water causes increasingly higher concentrations of dissolved solids in the remaining water. The addition of "make up" water to replace that lost by evaporation and drift does not sufficiently dilute the high concentrations of dissolved solids to prevent the solids from reaching or surpassing a level of saturation and then fouling the tower by forming scale on parts of the system and thus interfering with its operation. It becomes necessary to actually remove from the system some of the water with high dissolved solids concentration and add more make up water to keep the system operational with a level of dissolved solids that can be tolerated which must be below saturation. As a rule, blowdown water amounts to about 0.3 percent of the total system service water for each ten degrees farenheit of cooling achieved by the tower.

The need for the blowdown process creates two significant problems. The first problem is that of disposing of the blowdown water, which, by definition, is polluted with a high concentraton of dissolved solids. The second problem is one of water conservation. Although drift losses require make up, this portion of the total loss is relatively small, usually not exceeding 0.2 percent of the total water circulated in a well designed tower. The sum of the losses, however, including the loss due to blowdown, is significant in a large cooling tower. For example, in a modern 680,000 kilowatt generating plant, the amount of water circulated through the tower units under average summer conditions would be about 345 million gallons per day and the requirement for make up would be about 6.5 million gallons per day, a considerable portion of which could be saved if the blowdown operation were not required.

Therefore, it is the primary object of this invention to eliminate the requirement for liquid waste blowdown in a wet cooling tower operation by providing a method and means for removing the dissolved solids from the service water in a solid crystalline form.

A second object of the invention is to conserve fresh water resources by providing a method and means for effective use of make up water in a heat rejecting system whereby the quality of the make up water is not important; that is, low quality or industrial waste water havng total dissolved solids approaching saturation or having noxious dissolved or suspended solids would be acceptable into the system.

A third and important object of the invention is to utilize heretofore wasted heat energy for a socially valuable function, i.e. the disposal of polluted water.

A further object of the invention is to resolve environmental issues that delay and obstruct the construction of industrial and power plants by providing apparatus which will meet ultimate environmental requirements of no liquid waste discharge and no thermal pollution. This same object may be met by providing additional industrial plant siting alternatives.

A further object of the invention is to provide means for removing dissolved solids from cooling tower water where a substantial part of the cost thereof is chargeable to the waste heat rejection function and the dissolved solids removal cost is minimal.

An additional specific object of the invention is to provide means that can function either as a conventional cooling tower with conventional controls and water chemistry or as both a cooling tower and a remover of dissolved solids from service water.

Another object of the invention is to provide means for economic recovery from water of commodity chemicals.

A further object of the invention is to provide a means of water pollution abatement which allows the employment of many different water treatment chemicals since the waste water is not discharged.

A still further object of the invention is to provide a means of water pollution abatement capable of removing selected dissolved solids by adding chemicals to the waste water to develop insoluable compounds which are precipitated out of solution and then mechanically separated.

Another object of the invention is to provide a means for disposal of liquid waste water produced by water reclamation and purification processes, such as ion exchange, reverse osmosis, electrodialysis, multistage flash and vapor compression.

Although the prior art has practiced many methods for the removal of dissolved solids from large quantities of water such as liquid waste blowdown waters, such methods have not been noteworthy for their success, either economic or substantive. Some of these methods have included a process of reverse osmosis followed by brine disposal, ion exchange followed by brine disposal, mechanical evaporation sometimes followed by evaporation blowdown disposal, and the use of chemical precipitation and solar ponds. In view of the sometimes high cost and general ineffectiveness of these methods per se and in further view of the large quantities of heat associated with cooling tower operation, it is a further object of this invention to beneficially utilize otherwise wasted heat energy in creating a more effective and economical means of removing dissolved solids from large quantities of water, even where that object is paramount and without regard to waste heat rejection, such as, for example, the removal of certain chemical elements or compounds from sea water.

Other and still further objects, features and advantages of the present invention will become apparent from a reading of the following detailed description of a preferred form of the invention which is described in the context of its use in a wet cooling tower and which is taken in connection with the accompanying drawings in which.

THEORY

Figure 1:
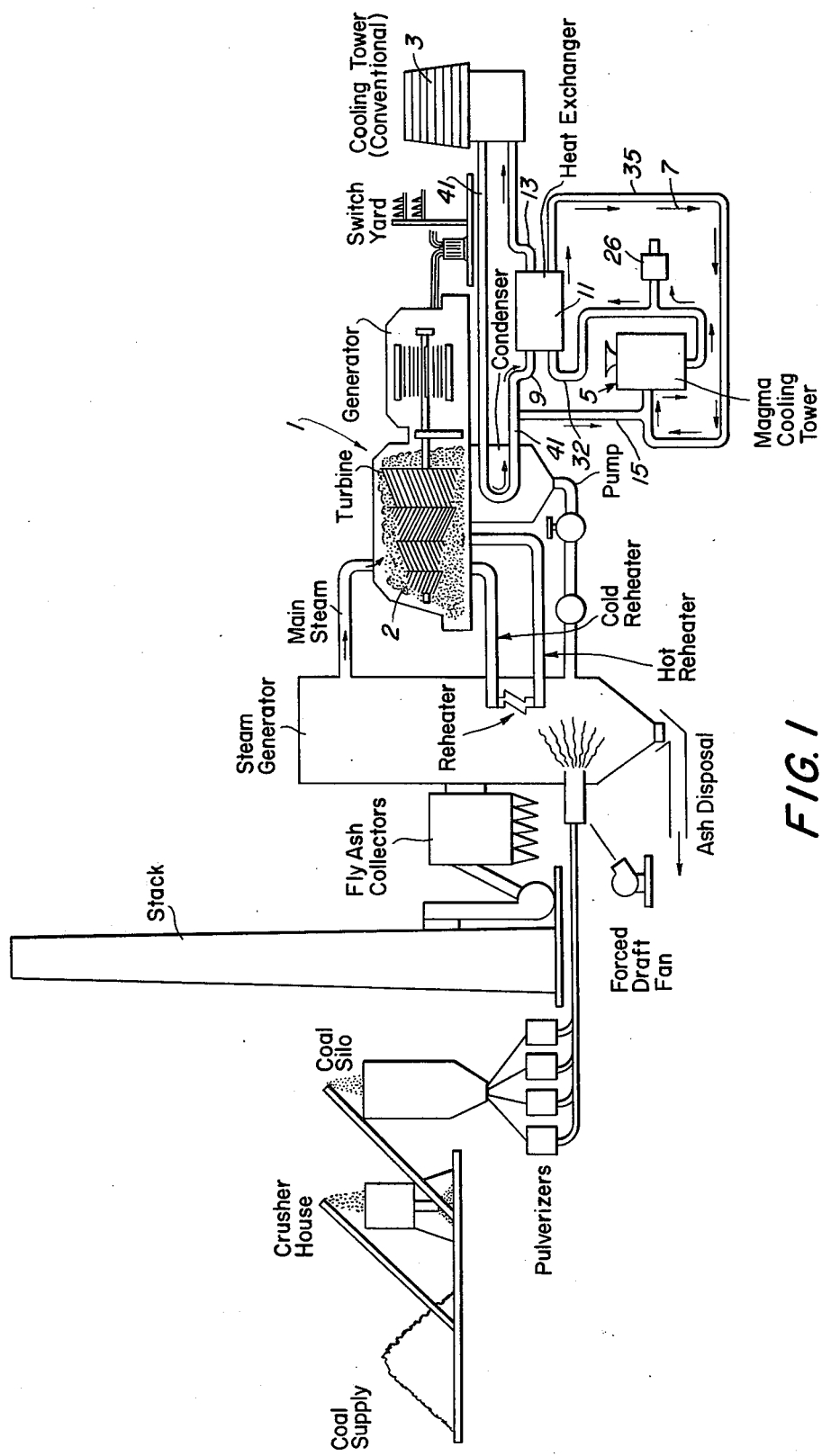
FIG. 1 is a diagrammatic view of a typical electrical generating station utilizing cooling towers and the method and means of the present invention to remove dissolved solids from the service water.

The practice and study of unit operations in the art of chemical engineering comprise two operations which are often thought of and treated categorically. These are evaporation and crystallization — both involving the simultaneous transfer of heat and mass.

In an evaporation operation, a solution is concentrated by evaporating the solvent. The concentration is continued until the solution becomes saturated and further until the solute precipitates as a crystalline solid. The operation is often called "crystallization".

The operation requires several rate processes. First, heat must be transferred from a heating medium to the solution. Second, mass and heat are simultaneously transferred from the liquid to the vapor phase. For a crystallization operation, there is also the simultaneous transfer of heat and mass between the solution and the solid phase.

To provide the appropriate background for the later discussion, it may be stated that the actual production of crystalline solids can be accomplished by methods ranging from those as simple as setting pans of hot concentrated solution out to cool to those as complex as continuous, carefully controlled, many step processes tailored to provide a product of uniform particle size, shape, moisture content and purity.

For these latter and more efficient processes, crystallization equipment can be conveniently classified in terms of the method used to obtain deposition of particles, keeping in mind that crystal formation involves the two steps of crystal nucleation and then subsequent crystal growth. The degree of supersaturation of the solution is the driving force in both of these steps and is, therefore, the basic variable in the process of obtaining deposition. The processes are commonly classified as follows:

1. Super-saturation produced by cooling without substantial evaporation:
   a. Atmospheric cooling by natural convection
   b. Cooling by a liquid cooling medium absorbing heat through metal surfaces.
2. Super-saturation produced by evaporation without substantial cooling, where the heat to produce evaporation is transferred to the solution through metal surfaces. Examples: crystallizing evaporators, Krystal evaporator crystallizer.
3. Super-saturation produced by adiabatic evaporation and cooling.

Normally in the chemical industry, choice of equipment and method depends on the solubility-temperature relation of the substance to be crystallized. For solutes with a small positive temperature coefficient of solubility, or a negative coefficient, supersaturation must be developed by evaporation.

Inasmuch as the development of super-saturation by means of the class 2 process, that is evaporation without substantial cooling, is often carried out in equipment that has the physical characteristics of a simple evaporator and, in fact, is designed essentially as an evaporator largely because the essential engineering problem is one of heat transfer, it is apparent through the discovery of this invention that an evaporative cooling tower and its inherent elements can be used to perform as a crystallizing evaporator.

Concededly, and by definition, a crystallizing evaporator operates in the super-saturated range, whereas a cooling tower, although operating primarily as an evaporator, is normally controlled to operate in the sub-saturation range to avoid fouling the tower and associated service water circuits. However, if the super-saturated water is kept isolated from the rest of the system, the cooling tower and its own water circuit may be operated at super-saturated levels without fouling the rest of the system. In such a mode, the dissolved and suspended solid content of the fluid circulating in the isolated loop can be managed so that controlled crystallization is achieved and crystaline solids removed from the loop.

In addition to the other related characteristics of the industrial crystallizing evaporator and a cooling tower, there is a second and most important factor which lends itself to the conversion of a cooling tower per se to an operating crystallizing evaporator. As stated earlier, one of the required rate processes in a crystallizing operation is the transfer of heat from a heating medium to the solution. Under normal circumstances, the heat energy must be generated, but in the concept of the present invention, the heat energy is already present, in the form of surplus or waste heat which is normally being thrown away. This surplus heat energy provides the heat necessary to propel the crystallization operation.

Unlike industrial crystallization operations where there is customarily a single solute to deal with, the medium of the cooling tower operation is likely composed of a number of different solutes, some perhaps having positive temperature co-efficients of solubility while others have negative co-efficients, such as calcium sulfate. These complexities suggest that methods of fractional crystallization may be utilized in the operation as well as the process of controlling crystallization by the addition of one or more other solvents, solutes or other substances.

In order to maximize the rate of formation of crystals, to create a more uniform chemical product, to permit more control of the super-saturation of the solution and to reduce the required level of super-saturation, the solutions within the cooling tower circuit are preferably seeded with crystals of the dissolved solid material, a technique which is known in the art of crystallization.

PROCESS AND APPARATUS

Figure 2:
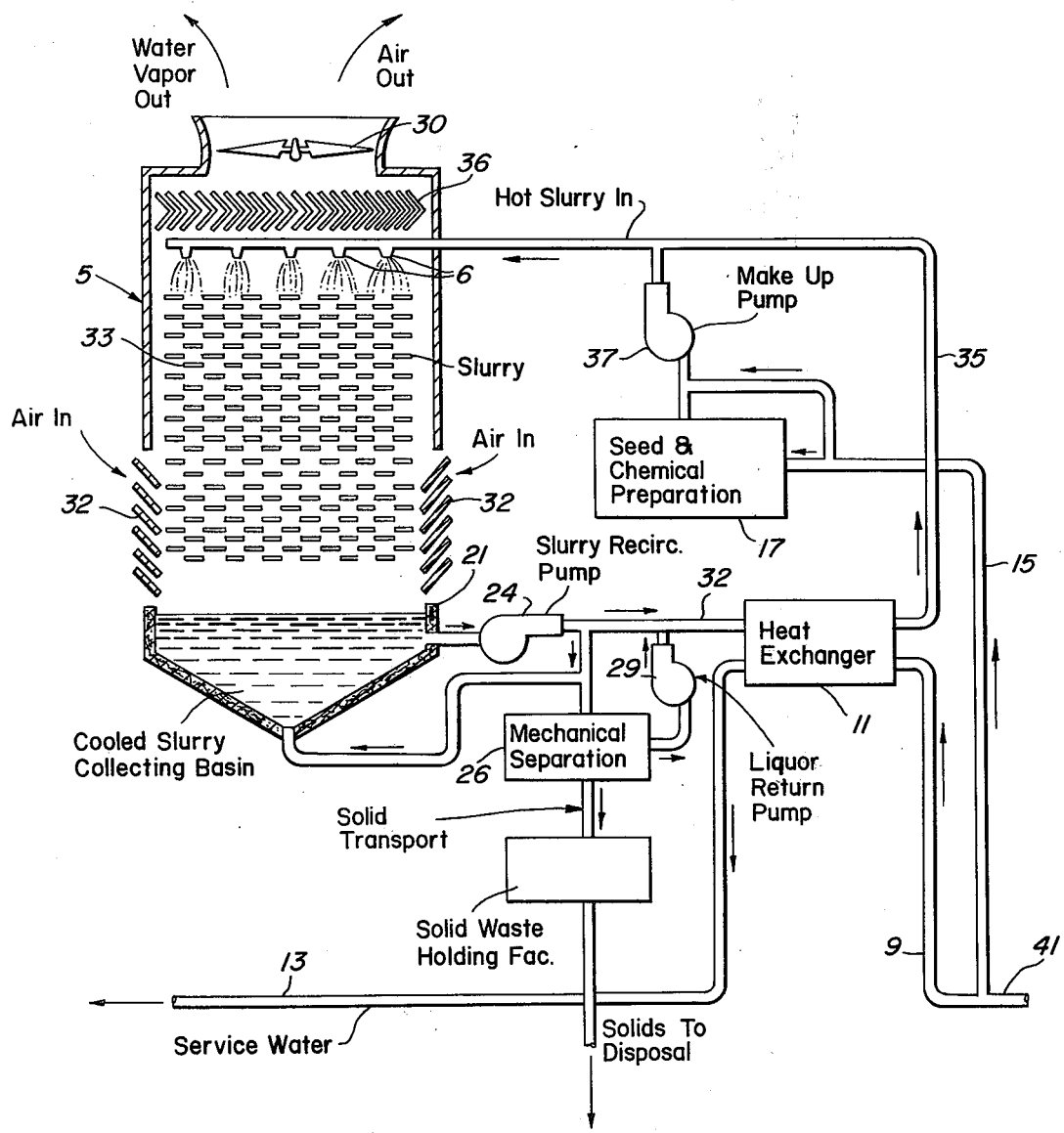
FIG. 2 is a diagrammatic flow chart of the preferred form of the process of the present invention.

The diagram of FIG. 1 illustrates a preferred form of the present invention as seen in connection with a typical electrical generating plant 1 employing steam turbines 2. A system of cooling towers is indicated by reference number 3. A mechanical-draft counterflow cooling tower especially adapted for use in the inventive process is generally indicated by reference number 5 in FIG. 2. It is understood that the tower 5 is one of several cooling towers in the system 3, the others being entirely conventional in their construction and operation. The cooling tower 5 is a vertically oriented structure having a fan 30 at the top to draw air in through the louvers 32 in the lower portion of the sides. The air moves vertically upward through the falling fluid which has been discharged through a series of nozzles 6 in a distribution system. A series of splash bars 33 (called "fill") are layed within the tower to a considerable depth to interrupt the fall of the water, causing it to break into fine droplets to increase evaporative efficiency. Above the distribution system are disposed a series of baffles 36 to reduce drift and consequent loss of water. A funnel-shaped basin 21 at the bottom of the tower collects the liquid after it has fallen through the tower.

Although the tower 5 is substantially conventional, the details of its construction and design should be adjusted to efficiently accommodate the slurry or magma which will be running through the tower as opposed to unsaturated water in the completely conventional tower. For example, horizontally disposed fill should be replaced with a more vertically oriented structure to avoid piling up of slurry on a horizontal surface, an occurance which leads to solid deposition on the surface of the fill bars. Maximizing surface area by creating thin films of falling slurry is an effective alternate to the creation of small droplets. The cooling tower should be designed to keep and maintain maximum speed of magma movement throughout in order to avoid settling out of the solids within the tower.

The service water circulating in the conventional portion of the system (indicated by reference number 41 in FIG. 1) is subjected to increasing concentrations of dissolved solids because of the evaporative loss of water, as discussed earlier. Normally, a portion of this circulating water would be bled off as blowdown waste water, but according to the present invention, this "blowdown water" is tapped off of the service water circuit and is directed by a conduit 15 into an isolated closed path 7, a portion of which comprises the special cooling tower 5 and a heat exchanger 11.

A portion of the remaining service water is directed by a conduit 9 to the heat exchanger 11 from which it is returned to the service water system via a conduit 13.

That portion of the water which is directed to conduit 15 is divided into two paths, one to zone 17 of seeding and chemical preparation, and the other to a by-pass around the zone 17. The seeding apparatus 17 stores, mixes and injects slurry seed crystals into the make up water coming into the zone. The zone 17 apparatus also includes means for injecting chemicals to cause selective super-saturation. Sufficient seed crystal is injected into the the circulating fluid by the seeding apparatus to maintain a population of solute crystals in the fluid which have sufficient surface area per unit volume of solution to initiate a proper rate of deposition on the solute crystals in suspension. The rate of change and degree of super-saturation can be controlled by modulating the amount of solute crystal surface area per unit volume of solution. Inasmuch as the dissolved solids in solution prefer to crystalize into their solute crystals rather than on a foreign material, such as the materials of the cooling tower construction, the degree of super-saturation is selected to allow for crystallization but to avoid scaling.

The portion of the circulating fluid which receives an injection of seed crystals in the seeding zone 17 is reunited with the by-passed make up water and pumped as a hot slurry or magma into the spray nozzles 6 of the distribution system of the cooling tower 5. As the slurry falls through the splash bar fill 33 of the cooling tower, evaporation and concentration take place and the cooled magma is collected in a basin 21 at the bottom of the tower. A portion of the flow from the slurry recirculating pump 24 is directed to a mechanical separator 26 where the crystalized solids are separated by any one of many well known processes. A liquor return pump 29 returns the liquid output of the mechanical separator to join the magma from the recirculating pump 24 in conduit 32 which transfers the magma and the liquor through the heat exchanger 11 where sensible heat is transferred from the hot service water which enters the heat exchanger through the conduit 9 in order to propel the crystallizing process. After passing through the heat exchanger 11, the heated slurry is directed through conduit 35 where it joins the output of the make up pump 37, pumping the make up water and prepared water out of the seed and chemical preparation zone 17.

In this preferred form, seeding is only used at start-up to establish an initial seed background in the fluid circulating in the isolation loop. Thereafter, crystallization is propagated by self-nucleation and growth, primarily in the tower and its collecting basin. The suspended solids (seed) content of the circulating slurry in excess over that necessary for controlled crystallization is removed in the mechanical separator 26, previously described.

The sensible heat transferred through the heat exchanger 11 to the circulating magma is carried away, mostly by evaporation in the cooling tower 5. The sensible heat load to the cooling towers 3 is reduced by that heat transferred through the heat exchanger 11.

Figure 3:
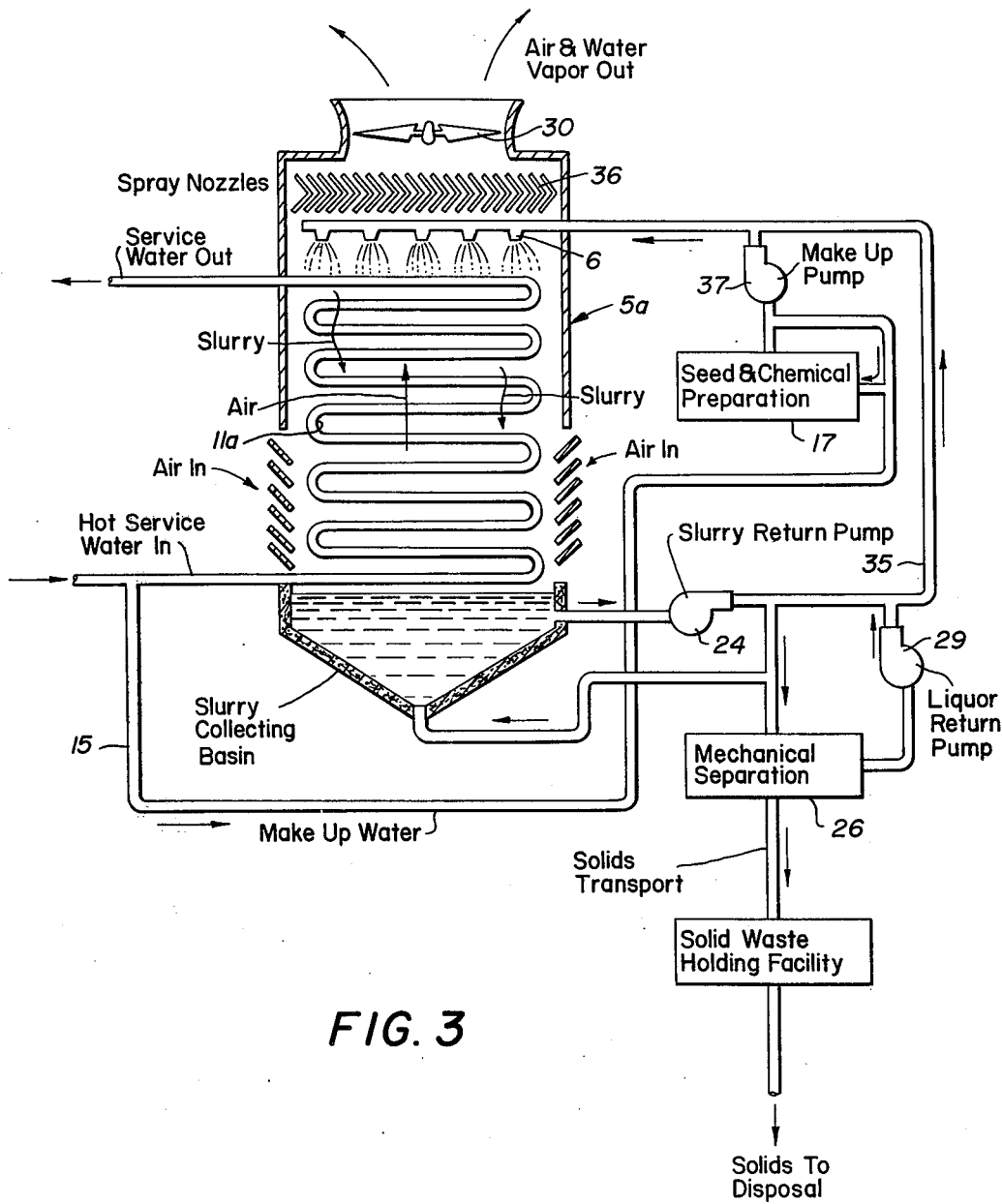
FIG. 3 is a diagrammatic chart of the second embodiment of the process and apparatus of the present invention.

The embodiment of FIG. 3 is not conceptually different from that shown in FIG. 1, however, as depicted in the figure, the necessary modifications of the conventional cooling tower lend themselves to a tower 5a wherein the coils of the heat exchanger 11a can serve as fill in the tower. The coils may themselves serve as fill or splash bars or they may be disposed between flat heat conducting surfaces over which flows a thin film of slurry.

I claim:

1. A crystallizing evaporator comprising:
   means forming a fluid circulation loop having an input and an output wherein the output of the loop comprises mechanical separating means connected in parallel with the loop;

seed crystal injecting means connected to the said loop;

a source of heat energy disposed within said loop to raise the temperature of fluid circulating therein;

an evaporator disposed in said loop comprising:
   an enclosed housing having an opening in the top thereof and vent means in the lower sides thereof to permit a flow of air therethrough;
   fluid distribution means disposed within the top portion of the housing and connected to the said loop;
   fluid collecting means disposed at the bottom of the housing and connected to the said loop;
   a plurality of spaced apart surfaces disposed between the distribution means and the collecting means for maximizing the surface area of the fluid flowing between the distribution means and collecting means.

2. The combination of claim 1 wherein the source of heat energy is disposed within the evaporator housing.

3. The combination of claim 1 wherein said evaporator further includes means for producing air flow through the housing.

4. Apparatus for removing dissolved solids from condenser cooling water comprising:
   a closed fluid path having an input and an output;
   means diverting a portion of the condenser cooling water to the input of the loop;
   seed crystal injecting means connected to the loop for forming a slurry within said loop;
   an evaporative cooling tower in series within said loop, said tower having vertically spaced apart fluid distribution and fluid collecting means, and means producing a flow of air through said tower;
   mechanical crystal separator means forming the loop output and connected in parallel with the loop; and
   heat exchanger means disposed in said loop, said heat exchanger having an input connected to the said condenser cooling water.

5. Apparatus for removing solids from service water comprising in combination:
   means diverting service water into first and second portions;
   means forming a closed path for circulating said first portion of the water, including evaporator means;
   means injecting seed crystals into the closed path for forming a magma;
   separating means connected in parallel to said path for separating crystaline solids from the magma;
   heat exchanger means; and
   means carrying said second portion of service water through the heat exchanger.

6. The process of removing dissolved solids from water comprising the steps of:
   circulating the water in a closed path, which path includes the process of evaporation;
   injecting seed crystals into the water circulating in the path, forming a magma;
   diverting a portion of the magma from the path and separating crystalline solids therefrom, and
   transferring heat energy to the circulating magma.

7. The process of claim 6 wherein the process of evaporation further includes the steps of:
   creating a moving draft of air;
   distributing the circulating magma in intimate contact with the draft of air;
   breaking the magma up into small droplets or a thin film, and
   collecting the magma after it falls through or past the draft of air.

* * * * *